March 8, 1949. M. LOEB Re. 23,088

MERCHANDISE DISPLAY CARD

Original Filed Jan. 16, 1946

INVENTOR
MORITZ LOEB
BY Ely & Pattison
ATTORNEYS

Reissued Mar. 8, 1949

Re. 23,088

UNITED STATES PATENT OFFICE 23,088

MERCHANDISE DISPLAY CARD

Moritz Loeb, New York, N. Y.

Original No. 2,424,762, dated July 29, 1947, Serial No. 641,445, January 16, 1946. Application for reissue February 27, 1948, Serial No. 11,382

4 Claims. (Cl. 206—80)

This invention relates to display cards for articles of merchandise such as small articles of hardware.

An object of the invention is to provide a device on which the article can be easily, surely, and economically displayed and so simply that the cost of producing and assembling the device is reduced to a minimum.

Generally speaking the invention concerns a display card on which an article is mounted by a form such as an endless band of material which is flexible such as wire which is bent into engagement with slotted portions of the card in a novel manner to cause the band to overlie the article and hold it on the card.

More specifically the form is an endless wire band of elongated configuration which is bent upon itself at each end to engage and project into slotted portions of the card and is along its mid portion disposed to bear against the article on the front face of the card to hold the article thereon.

More particularly the device comprises a card provided with pairs of slots which are disposed adjacent the ends of the card while the elongated endless wire band has its ends bent around and inserted through the slots and then bent inwardly to lie against the rear face of the card. The portion of the band disposed on the front of the card extends along and over the article and holds the article securely thereon.

Therefore, it is apparent that an endless elongated metal wire band is bent at each end to project into slots in the card at the ends of the article disposed thereon and that the main portions of the wire pass along above the article and bear thereagainst to hold the article in place on the card. This provides an extremely simple, inexpensive, and yet certain means for holding articles on cards without the usual cumbersome and expensive means hitherto provided.

The preferred present form which the invention may assume is illustrated in the drawings, in which, Figure 1 is a front elevational view of an article held on a card in accordance with my invention.

Figure 1:
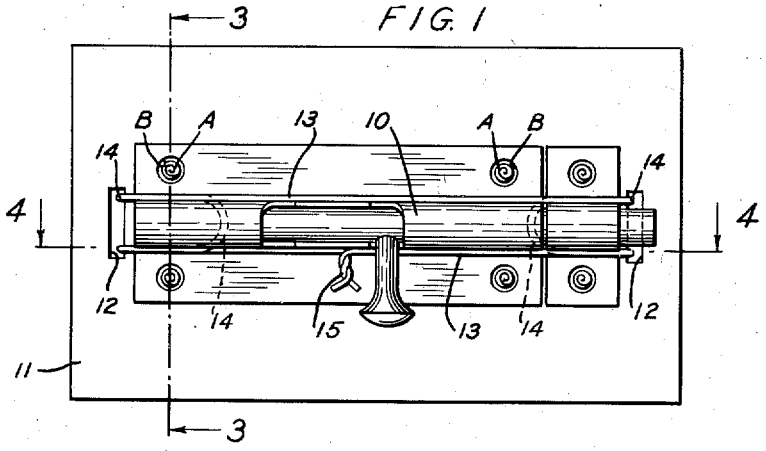

In the form of the invention illustrated in the drawings, it is to be noted that the article to be displayed, in this case a barrel bolt 10, is mounted on a card 11. The card 11 is made of rigid cardboard so as not to flex under the weight imparted thereto by the article supported thereon. In this case the card is provided with slots 12 disposed therein adjacent each end of the bolt 10 and slightly beyond the ends thereof.

Figure 2:
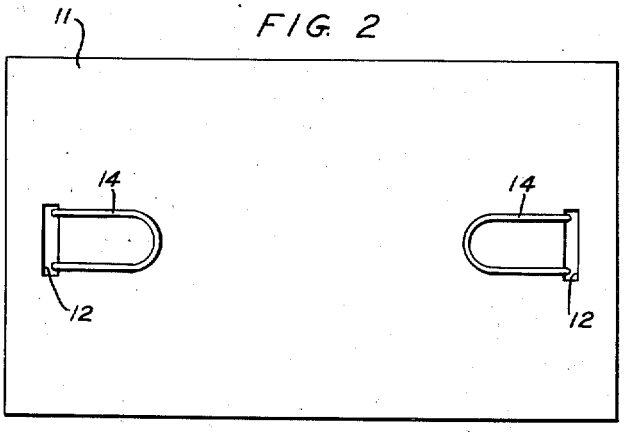
Figure 2 is a rear elevational view of the display card.
Figure 3:
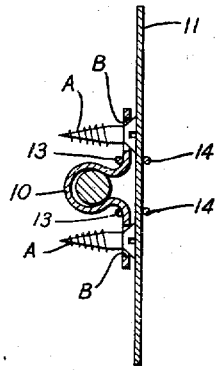
Figure 3 is a vertical transverse section taken on the line 3—3 of Figure 1.
Figure 5:
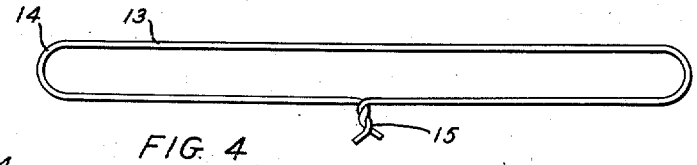
Figure 5 is a plan view of the elongated wire securing band.
Figure 4:
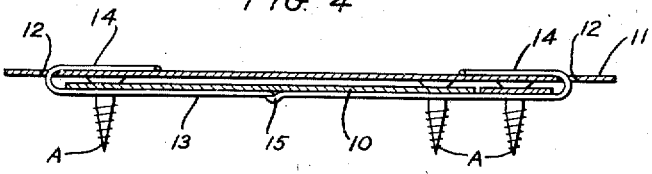
Figure 4 is a horizontal sectional view taken on the line 4—4 of Figure 1.

In order to hold the article 10 in place on the card, a flexible connector or retainer is provided in the form of an endless elongated band of wire 13. The loop ends 14 of said elongated band 13 are bent to project through the slots 12 and then bent inwardly to flatly lie against the rear face of the card 11 as shown in Figure 2. The main extended portions of the wire are seen to extend along above and in contact with the article on the front face of the card and hold the article in place thereon.

The elongated connector or clip 13 is preferably constructed of a single length of bendable wire having its ends secured together by twisting 15.

The stems of the fastening screws or elements A for securing the article of hardware in position in use extend through openings B in the article and have their heads disposed against the card 11. Thus the screws are held against displacement and are also visibly displayed upon the card.

It will be understood that the card 11 may have more than one pair of slots if desired to accommodate a plurality of wire form members 13 if desired.

The front face of the card may have suitable indicia printed thereon which relates to the article supported thereon and the source of its manufacture.

While the invention has been described in detail with respect to a present preferred form which the invention may assume, it is not to be limited to such details and form since many changes and modifications may be made in the invention without departing from the spirit and scope of the invention in its broadest aspects. Hence it is desired to cover any and all forms and modifications of the invention which may come within the language or scope of any one or more of the appended claims.

Having thus described the invention, what I claim as new and desire to secure by Letters Patent is:

1. In combination, a display card, an article of hardware flatly fitting against the front face of said card, said article having screw receiving openings therein, fastening screws having their shanks freely passing through the respective openings with their heads interposed between the front face of the card and the rear of the article, and an elongated member overlying the front of the article and cooperating with the screws for holding the article upon the card and having its ends secured to the card beyond the respective ends of the article.

2. In combination, a display card, an article of hardware flatly fitting against the front face of said card, said article having two rows of screw receiving openings therein, fastening screws having their shanks freely passing through the respective openings with their heads interposed between the front face of the card and the rear of the article, said card having slots therein beyond the respective ends of the article, and a bendable wire form member overlying the front of the article between the rows of openings and having its ends extending through the slots and bent over the rear face of the card.

3. In combination a display card, an article of hardware upon the front face of said card, said article having one or more openings therein, a fastening element for each opening, each element comprising a head and a shank extending therefrom, the head being in the opening, and interposed between the card and the article, and the shank projecting through the opening, and means engaging the face of said article and piercing said card to hold the article in place.

4. The combination according to claim 3 wherein said means comprises a wire clip piercing said card, and having its ends bent over to hold the article and card together.

MORITZ LOEB.

REFERENCES CITED

The following references are of record in the file of this patent:

UNITED STATES PATENTS

| Number | Name | Date |
|---|---|---|
| 1,890,181 | Hoffman | Dec. 6, 1932 |
| 2,263,039 | Jorgensen | Nov. 18, 1941 |